United States Patent
Moreira Neto

(10) Patent No.: US 10,191,150 B2
(45) Date of Patent: Jan. 29, 2019

(54) HIGH PRECISION RADAR TO TRACK AERIAL TARGETS

(71) Applicant: BRADAR INDÚSTRIA S.A., São José dos Campos (BR)

(72) Inventor: João Roberto Moreira Neto, Valinhos (BR)

(73) Assignee: EMBRAER S.A., São José dos Campos-SP (BR)

( * ) Notice: Subject to any disclaimer, the term of this patent is extended or adjusted under 35 U.S.C. 154(b) by 467 days.

(21) Appl. No.: 14/656,401

(22) Filed: Mar. 12, 2015

(65) Prior Publication Data

US 2015/0260837 A1    Sep. 17, 2015

(30) Foreign Application Priority Data

Mar. 14, 2014 (BR) .............................. 102014006109

(51) Int. Cl.
| | |
|---|---|
| *G01S 13/42* | (2006.01) |
| *G01S 13/88* | (2006.01) |
| *G01S 13/44* | (2006.01) |
| *G01S 13/66* | (2006.01) |
| *G01S 13/87* | (2006.01) |

(52) U.S. Cl.
CPC .............. *G01S 13/88* (2013.01); *G01S 13/42* (2013.01); *G01S 13/426* (2013.01); *G01S 13/4454* (2013.01); *G01S 13/66* (2013.01); *G01S 13/87* (2013.01)

(58) Field of Classification Search
CPC .................................................. G01S 13/4454
USPC .............................................................. 342/95
See application file for complete search history.

(56) References Cited

U.S. PATENT DOCUMENTS 3,317,910 A * 5/1967 Hausz ................. G01S 13/4454
                                                        342/423
3,900,846 A * 8/1975 Gibbon ..................... G01S 1/02
                                                        342/182

(Continued)

*Primary Examiner* — Peter M Bythrow
*Assistant Examiner* — Helena H Seraydaryan
(74) *Attorney, Agent, or Firm* — Nixon & Vanderhye P.C.

(57) ABSTRACT

High precision radar to track aerial targets installed on the ground, in a container or in a vehicle, to determine the target parameters, such as azimuth angle ($\theta_a$), elevation angle ($\theta_e$), range, speed and flying direction and transmits them to a weapon system which comprises an array of two collinear antennas (19, 21) with narrow beam in elevation, installed on a platform (12) and rotating around a vertical axis at a rotational speed of, at least, 50 rpm, in which the direction of the said array varies between 0° and 90° by means of a positioning motor in elevation (18), and the precise target elevation angle ($\theta_e$) is determined by interferometry. The precise target azimuth angle (9a) is determined through correlation between a signal detected by the said antennas (19, 21) with a +1/−1 step function, complemented by the search for the zero transition provided by the determination of the return pulse maximum. The target speed and direction values are determined by a prediction filter (50) based on the history of range, elevation and azimuth values obtained in previous measurements.

5 Claims, 3 Drawing Sheets

(56) References Cited

U.S. PATENT DOCUMENTS

| | | | |
|---|---|---|---|
| 8,174,433 B1* | 5/2012 | Hough | G01S 7/40 342/104 |
| 2006/0292991 A1* | 12/2006 | Abramov | H01Q 3/04 455/63.4 |
| 2012/0139777 A1* | 6/2012 | Hunter | G01S 13/5242 342/175 |
| 2015/0204973 A1* | 7/2015 | Nohara | G01S 13/426 342/107 |
| 2015/0219426 A1* | 8/2015 | Moraites | G01J 5/0022 89/1.11 |

* cited by examiner

HIGH PRECISION RADAR TO TRACK AERIAL TARGETS

FIELD OF THE INVENTION

This invention refers to a radar for military use capable of executing operations of surveillance, acquisition, classification, localization, automatic tracking and graphical visualization aerial moving objects such as helicopters and other aircraft, as well as transmission of the coordinates of these targets to a shooting system.

BACKGROUND OF THE INVENTION

The high precision radar to track aerial targets is a ground radar, installed, on the ground, in a container or in a vehicle, which determines the following parameters of the relevant aerial target:
azimuth angle;
elevation angle;
range;
speed;
flying direction The aforementioned five parameters are transmitted to another system which needs this precise information of the aerial target.

The aerial target tracking radar, herein abbreviated as RT and also called Shooting Radar works, most of the times, together with a Surveillance Radar, herein abbreviated as RV.

The RV determines the data of the aerial target through a temporal sampling of several seconds but with a much lower precision than that of the RT. Typically, the precision in the measurement azimuth and elevation angles of the RV ranges from 1 to 3 degrees, and the sampling time varies between 2 and 6 seconds. On the other hand, it scans a wide aerial space in a very short time: within only 4 seconds low altitude RVs can scan a volume of 60 km radium and 5 km height.

Therefore, the function of the RV is that of determining the existence of targets in a wide aerial volume within a few seconds.

The function of the RT is that of pursuing a target already determined by the RV in a very small aerial space, usually within a sphere with hundreds of meters radius centered on the target, with a sampling period of tenths of a second. Thus the RT calculates the azimuth and elevation angles with a precision of tenths or even hundredths of a degree, the range, the speed and the direction of the target in tenths of a second. This information is transmitted to the weapon system coupled to the RT.

DESCRIPTION OF THE STATE OF THE ART

Nowadays, three main solutions for the said function are known. The first consists of a radar equipped with an antenna without electronic beam control and with servomechanism to point the antenna in the azimuth and elevation angles. In this solution the antenna is initially pointed to the aerial target through the coordinates provided by an external sensor. After the radar detects the target, the antenna continuously and automatically pointed to the target by the radar itself.

The aforementioned five parameters are transmitted to a shooting system which needs this precise information of the aerial target.

The second solution comprises a radar equipped with an antenna endowed with electronic beam control and servomechanism for pointing the azimuth angle. The antenna is initially pointed to the aerial target through the coordinates provided by an external sensor. After the radar detects the target, the antenna is continuously and automatically pointed to the target by the radar itself. The difference with respect to the previously described radar is that the antenna is pointed in azimuth in a mechanical manner, whereas pointing in elevation, and quick azimuth pointing variants are performed in an electronic manner, through electronic beam control. The aforementioned five parameters are transmitted to a shooting system which needs this precise information of the aerial target.

The third solution consists of a radar equipped with three or four fixed antennas with electronic beam control and without servomechanism. Each antenna illuminates a sector in azimuth. With three antennas, each one illuminates and is responsible for tracking targets in a sector of 120 degrees in azimuth. With four antennas, each one is responsible for tracking the targets in a sector of 90 degrees in azimuth. Through the coordinates provided by an external sensor, the antenna responsible for the relevant target sector is activated and tracking is performed by electronic beam control in azimuth and elevation of the said antenna. The difference with respect to the radars described above is that pointing in azimuth and in elevation is carried out solely through electronic means by the antenna responsible for the sector in azimuth where the target is. The aforementioned five parameters are transmitted to a shooting system which needs this precise information of the aerial target.

Among these limitations of the state of the art, let us mention the fact that the first and second solution allow to track only one aerial target at a time. The third solution can simultaneously track various aerial target, but it has high costs, volume and weight.

Moreover, in the currently known state of the art, the antennas operates with a very narrow beam and the relevant electromagnetic wave radiation can be easily detected by the target intercepted. This interception is conducted by a receiver, dedicated to receive waves coming from the radar, and called ELINT or SIGINT. As soon as the target is detected by the RI used in the state of the art, the ELINT or SIGINT system send an alarm to the pilot, also providing the irradiation direction and the possible radar localization.

OBJECTIVES OF THE INVENTION

In view of the foregoing, one of the objective of this invention is that of providing a system and a method which allows tracking of various targets at the same time and with the same refresh rate of the radars of the state of the art.

Another objective is that of providing a system using antennas of reduced size.

Another objective consists of obtaining higher precision in elevation and azimuth angle than that of currently known RTs.

Another objective is that of providing a system whose weight, volume and cost are lower than those of state of the art RTs.

Ultimately, this invention aims at providing a radar whose radiation is not detectable by intelligence systems such as FLINT or SIGINT.

SUMMARY OF THE INVENTION

The aforementioned objectives, an others, are achieved by the invention through the provision of a system which uses an array of two collinear antennas with narrow beam in elevation, in which the precise elevation angle of the target is determined through interferometry, the direction of the said array varies between 0° and 90° by means of a positioning motor in elevation, which is resupplied by the signal resulting from processing data of previous measurements.

In conformity with another characteristic of the invention, the width of each antenna, in elevation, is approximately 3 degrees, and the width if the beam in azimuth is 120 degrees.

In conformity with another characteristic of the invention, the increase in precision in the determination of the target elevation angle $\theta_e$ is obtained through the use of the interferometric technique such as described in patent document E19902007 Verfahren zur interferometrischen Radarmessung (Method for radar interferometric mediation) by Klausing and Wolframm.

In conformity with another characteristic of the invention the increase in resolution in azimuth is obtained through the aperture synthesis technique introduced by Klausing in patent DE3922086 Radargerat mit synthetischerApertur auf der Basis rotierender Antennen (Radar system having synthetic aperture base on rotational antenna), also indicated with the acronym ROSAR (Rotating Synthetic Aperture Radar).

In conformity with another characteristic of the invention, the method uses one RV and one RT, and involves successive iterations from the initial setting of the search volume provided by the RV, and the other iterations are based on data provided by the RT.

In conformity with another characteristic of the invention, the precise elevation values are obtained by interferometry, precise azimuth values are obtained through correlation techniques and range precise values by pulse maximum.

In conformity with another characteristic of the invention, range, elevation, azimuth, speed and direction values, refreshed to the instant of their presentation, are calculated by a recursive prediction filter, based on old range, elevation and azimuth values.

In conformity with another characteristic of the invention, the filter used is a Kálmán filter.

In conformity with another characteristic of the invention, the said prediction filter provides data to adjust both radar operations and she data for the weapon system.

In conformity with another characteristic of the invention, the said data for operation adjustment comprise the elevation angle for the elevation motor, the range for the range band selector and the azimuth.

In conformity with another characteristic of the invention, the said data provided to the weapon system comprise range, elevation angle, azimuth angle, speed and direction.

DESCRIPTION OF THE DRAWINGS

The other characteristics and advantages of the invention will be more evident from the description of a preferred embodiment, given as example and not as limitation, and from the figures they referred to in which.

DETAILED DESCRIPTION

Figure 1:
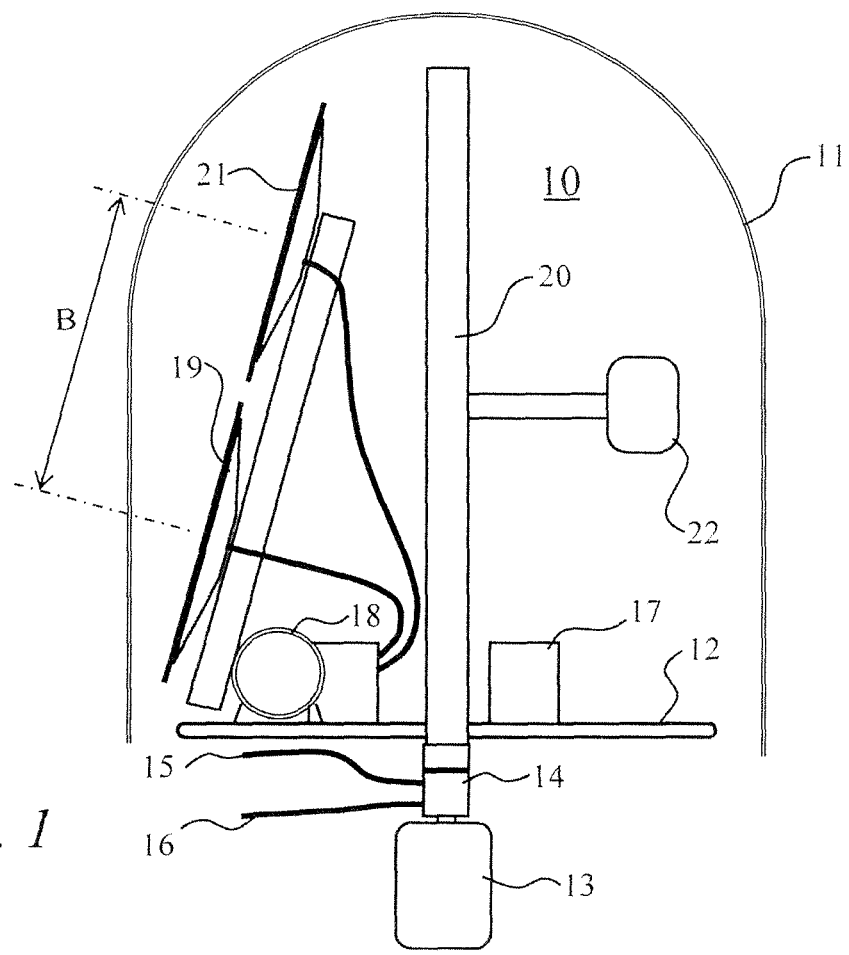
FIG. 1 shows a RT mechanical construction, in conformity with the principles of the invention.

With reference to FIG. 1, the subject matter of the invention comprises a rotational part 10, which is protected by a radome 11, and the said part consists of a base 12, azimuth motor 13, a rotational joint 14, an electronic box 17, an elevation motor 18, lower antenna 19 and upper antenna 21 and a counterweight 22 for balancing. The rotational joint 14 allows the communication between the external world and the RT, since it comprises a power supply connection 15 and an interface communication connection 16, in which the said supply can be a DC or AC power supply; and the communication can use RS232, RS422 techniques, Ethernet or any other physical communication protocol. Signals in transit in the communication interface comprises azimuth motor control, elevation motor control and the signals transmitted and received by antennas.

Rotation axis 10 is vertical, and cross the center of azimuth motor 13, which makes the axis and all the rotational part 10 rotate at more than 50 RPM. The typical values are 60 and 120 RPM.

Figure 2:
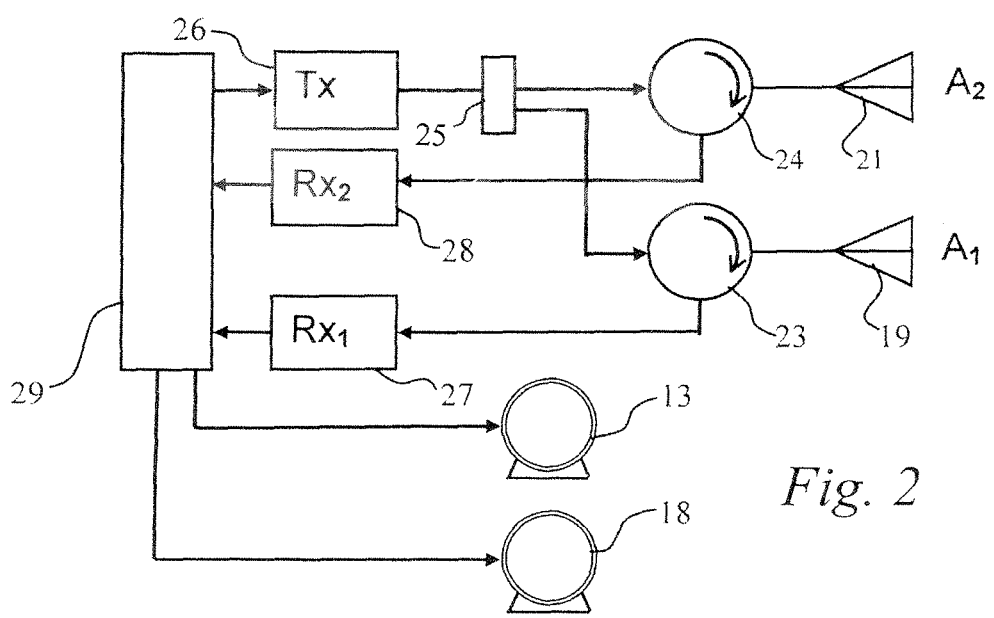
FIG. 2 shows a block diagram, in conformity with the principles of the invention.

FIG. 2 shows the RT block diagram. Lower antenna 19 and upper antenna 21 of FIG. 1 are represented as 19 and 21, respectively, in FIG. 2. Electronic box 17 of FIG. 1 includes circulators 23 and 24, power divider 25, power amplifier 26, low noise amplifiers 27 and 28 and processing unit 29.

Processing unit 29 generates the transmission pulse, which is amplified by power amplifier 26 and its power is divided between its two antennas by divider 25. The two divider outputs are conveyed to circulators 23 and 24 and are conveyed, for transmission, to antenna 19 and 21, respectively.

The return signal is received by the same antennas 19 and 21, whose signals cross circulator 23 and 24, respectively, through amplifiers 27 and 28, and finally reaches processing unit 29. From the analysis of these signals, the processing unit transmits signals to the elevation motor control in order to maintain the sight line pointed to the target elevation.

Figure 4:
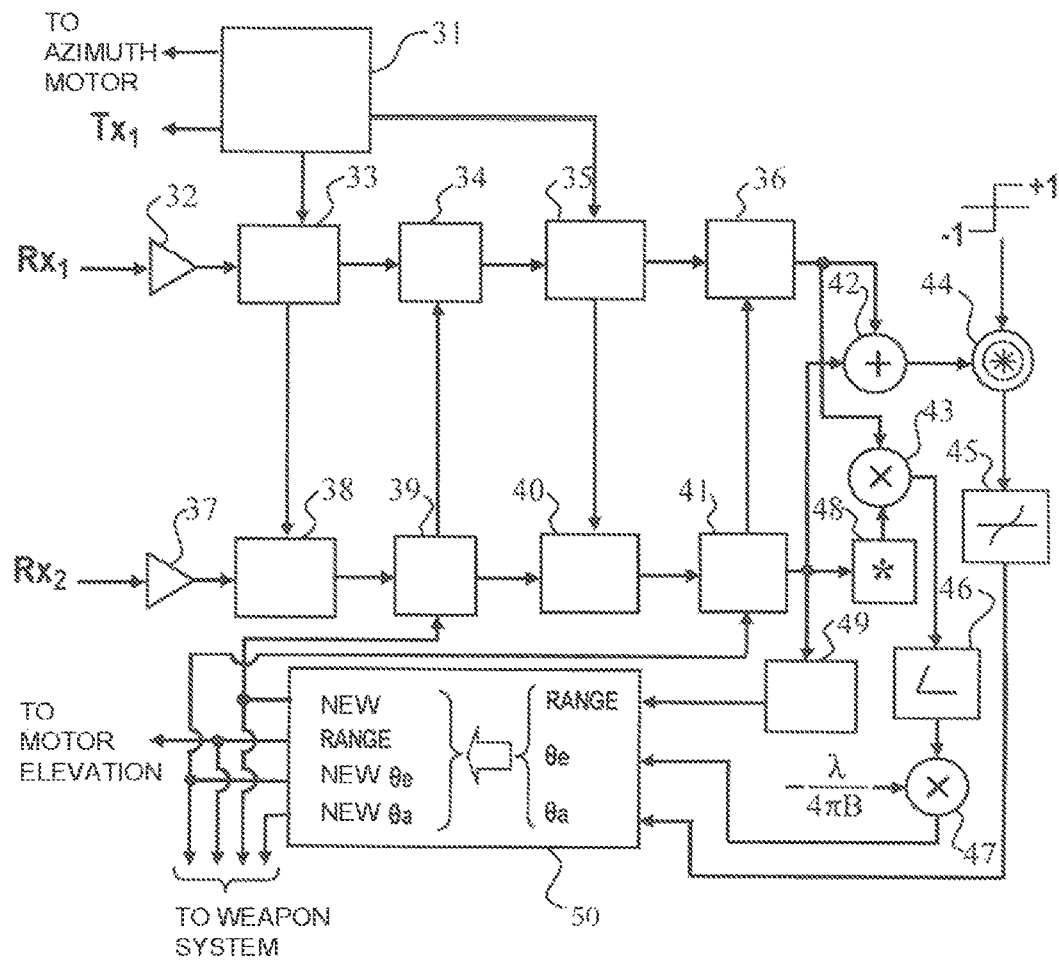
FIG. 4 shows a block diagram of the processing unit, in conformity with the principles of the invention.

A more detailed outline of the processing unit is presented as a block diagram in FIG. 4. In this diagram, block 31 represents the control subsystem, responsible for the timing of all the processing unit subsystems, the control of the motor in azimuth 13 of FIGS. 1 and 2 and for the generation of the transmission pulse for the power amplifier Tx (shown in FIG. 2).

With regards no the reception modes, the signals of Rx1 and Rx2 amplifiers (referenced as 27 and 28 in FIG. 2, respectively) reach. Analogic-Digital converters 32 and 37, whose outputs are range-compressed by range-compression units 33 and 38. Range band selectors 34 and 39 define the range dimension, one of the three dimensions of the volume of observation around the target under tracking. For instance, from the instrumental 20 km range, obtained through Analogic-Digital Converters 32 and 37, only one band from 15 to 18 km is selected for subsequent processing, since the target is encountered at 16.5 km.

After the said range band selection, the signals are range-compressed by range compressors 35 and 40. The target is localized through the search of the maximum of the main lobe of the azimuth compressor outputs 35 and 40, performed by target localizers 36 and 41.

The target range is determined by the maximum of the signal provided by target localizer 41, which searches the maximum range of any one of the signals provided by blocks 36 and 41, indifferently, which have equal amplitude and differ only in their phase. The value of this range is transmitted to the prediction filter.

In order to obtain the target position in azimuth, the signs of target localizers 36 and 41 are summed by adder 42, gaining 3 dB and the search for the maximum in azimuth is conducted by correlating the output lobe of adder 42 and function +1/1 with correlator 44 and the transition search for zero with zero localizer 45. The position of the zero in zero localizer 45 provides the precise value of the target angle in azimuth and its value is transmitter to the prediction filter (20).

The highly precise value of the target elevation angle is obtained through interferometry between signals received by the upper and lower antennas. Interferometry is based on the calculation of the phase between the two antennas, the conversion of these phases to distances and its respective conversion to elevation angle. The calculation of the phase is performed by multiplying the upper antenna signal of target localizer output 36 times the signal conjugate of the lower antenna through multiplier 43 and extracting the phase through the arctangent function of phase extraction subsystem 46. The signal conjugate of the lower antenna is obtained from the lower antenna signal of target localizer 41 through inversion of the imaginary part of the complex signal by the subsystem in order to conjugate 48, that is, the said block 48 extracts the conjugate from (a+bj) which is (a−bj). For the conversion of the phase to elevation angle, a phase multiplication of the extraction system of phase 46 times constant $-\lambda/(4\pi B)$ is performed by multiplier block 47. The multiplier output is the precise azimuth value, which is transmitted to the prediction filter (50). As shown in FIG. 1, in the constant used in multiplier 47, $\lambda$ represents the wavelength of the electromagnetic wave transmitted by upper antenna 21 and lower antennas 19, and B is the Base Line.

The precise values of range, elevation and azimuth, deriving from maximum localizer 49, multiplier 47 and zero localizer 45, respectively, are inputted in prediction filter 50, whereas target speed and direction are calculated by the said filter based on the history of the range, elevation and azimuth values obtained in previous measurements.

These values are precise, although they refer to a time delayed of some tenths of a second and have a known acquisition time, since the said delay results from the processing time of the information. This delay is accepted neither to monitor the elevation motor nor for the weapon system. These require precise measurements already calculated for the exact instant in which they are presented. Prediction filter 50 estimates range, elevation, azimuth, speed and direction values already refreshed for the instant of presentation, based on old range, elevation and azimuth values, as more recent values have a greater weight than older values. The filter used is a recursive filter; a Kálmán filter is used in a preferred embodiment.

The said prediction filter provides elevation angle $\theta_e$ to elevation motor 18 in FIG. 1, the range to range band selectors 34 and 39 and angle $\theta_a$ to target localizers in azimuth 36 and 41. These three values define the volume of search around the target under tracking.

The same prediction filter 50 also provides range, elevation angle, azimuth angle, speed and direction to the weapon system.

Figure 3:
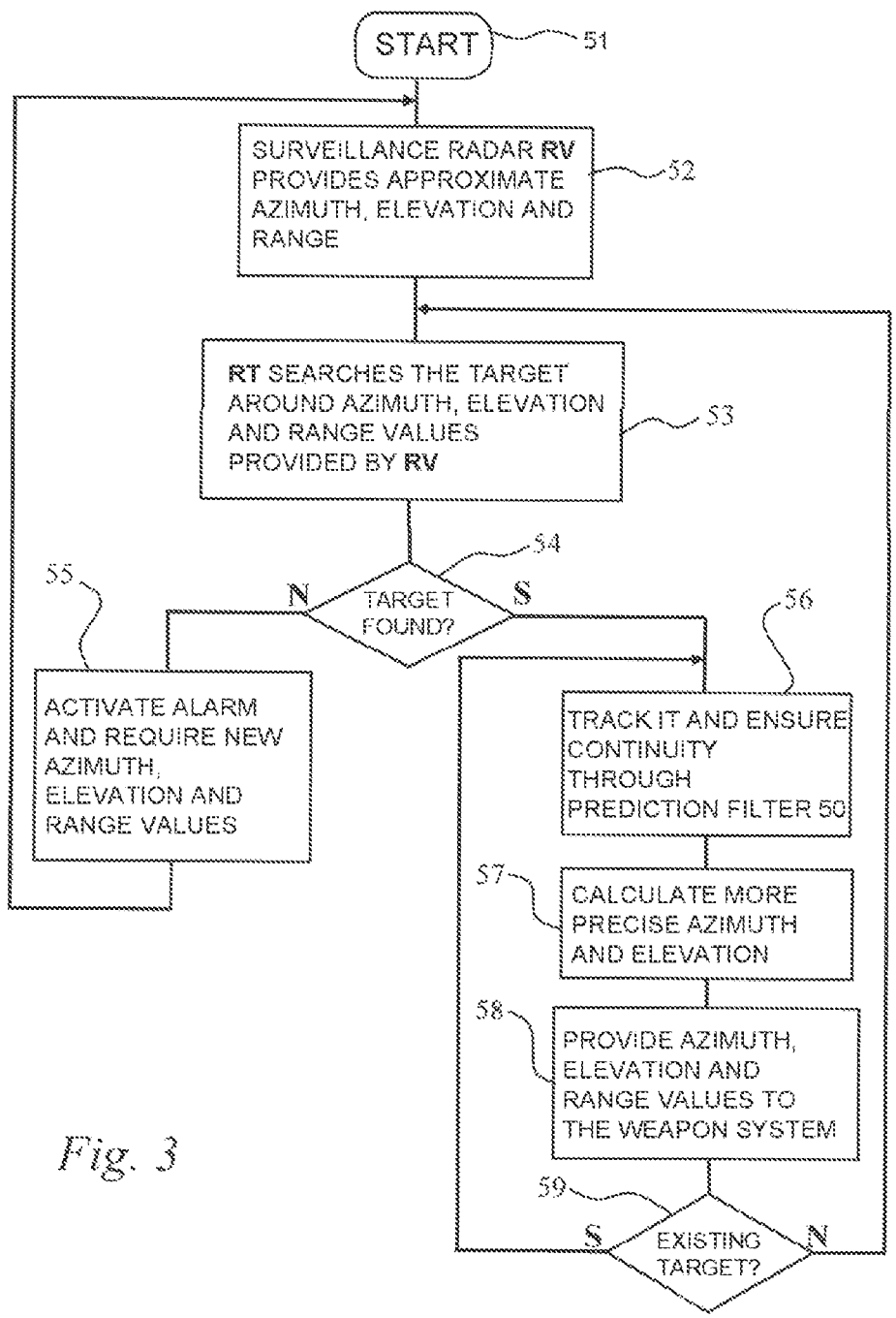
FIG. 3 snows flowchart representing the functioning of RT working together with a RV, in conformity with she principles of the invention.

FIG. 3 shows a flowchart representing the functioning of RT working together with a RV. If there is no support of RV information, the information on range, elevation angle and azimuth angle can be provided by another sensor, other equipment or even a specialized observer.

The process begins waiting (step 51) the information on range, elevation and azimuth angle, which must be provided by the RV. As soon as this information will be available, step 52, the RT search the target within a volume centered in this position information, step 53. The search volume size depends on the information origin. If the information comes from a RV or from another sensor, the size of this volume depends on the measurement error of the information. The greater the error of the range or elevation and azimuth angle measurement, the greater the respective search volume size. In subsequent iterations, when the RT conducts the search in a volume whose center is based on the information of range and azimuth and elevation angles of the RT itself, the volume size will be much lower that the initial one.

The RT may or may not find the target; step 54. If the target is not localized within the initial volume, the system requests new target coordinates to the RV or another positioning sensor, step 55.

If the RT finds the target, it starts tracking through the prediction filter, step 56. During this tracking the elevation motor will be continuously monitored so that the lobes of upper and lower antennas will always be with the maximum pointed to the target, step 57. The azimuth motor always carries on nominal rotation, for instance, of 60 or 120 RPM.

During tracking the prediction filter continuously provides the precise values of range, elevation and azimuth angles, speed and direction of the target to the weapon system, step 58.

This process continues until the RT stops tracking the target, step 59. In this case it begins the search within the volume centered on the last positioning information. If the RT keeps missing the target it requires again a RV position and all the process restarts.

The invention claimed is:

1. High Precision Radar To Track Aerial Targets, installed on the ground, in a container or in a vehicle, which determines the following parameters of the target, namely, azimuth angle ($\theta_a$), elevation angle ($\theta_e$), range, speed and flying direction and transmits them to another system said radar comprising an array of two collinear antennas with narrow beam in elevation wherein electromagnetic wave energy radiated from said antennas is spread over a 120-degrees beam width in azimuth installed on a platform and rotating around a vertical axis at a rotational frequency of, at least, 50 rpm, wherein the precise azimuth angle of the target ($\theta_a$) is determined through correlation of the signal detected by the said antennas and a +1/−1 step function, wherein an adder is configured to sum the signals of target localizers gaining 3 dB wherein a correlator is configured to correlate an output lobe of the adder and the +1/−1 function, wherein a zero localizer is configured to search for a transition of said correlated signal through zero.

2. Radar as claimed in claim 1 wherein the precise elevation angle of target ($\theta_e$) is determined by interferometry.

3. Radar as claimed in claim 1, wherein the precise range of the target is determined through a process comprising selection of the range band followed by compression of the signals by range compressors and search of the maximum value of the main lobe of said signals.

4. Radar as claimed in claim 1, wherein it operates together with a surveillance radar (RV) which provides approximate azimuth, elevation and distance values to the high precision radar (RT) which provides data to a weapons control system, said data comprising range, elevation angle, azimuth angle, target speed and direction.

5. Radar as claimed in claim 4, wherein the target parameters are calculated through successive iterations by the high precision radar (RT) from the initial values of these parameters provided by the surveillance radar (RV).

* * * * *